United States Patent [19]

Kindersley

[11] 4,217,923

[45] Aug. 19, 1980

[54] BALL VALVE WITH READILY REMOVABLE BALL AND SEATS FOR HIGH TEMPERATURE ENVIRONMENT

[75] Inventor: Peter G. Kindersley, Glens Falls, N.Y.

[73] Assignee: Kamyr Valves, Inc., Glens Falls, N.Y.

[21] Appl. No.: 887,773

[22] Filed: Mar. 17, 1978

[51] Int. Cl.² ............................................. F16K 43/00
[52] U.S. Cl. .................................. 137/315; 251/174; 251/214; 251/315
[58] Field of Search ............... 251/171, 172, 174, 214, 251/315; 137/315

[56] References Cited

U.S. PATENT DOCUMENTS

| | | | |
|---|---|---|---|
| 2,191,232 | 2/1940 | Heinen | 251/174 |
| 2,573,177 | 10/1951 | Bohlen | 251/174 X |
| 3,162,455 | 12/1964 | Englert | 251/214 X |
| 3,216,697 | 11/1965 | Holmberg | 251/214 X |
| 3,480,253 | 11/1969 | Priese | 251/315 X |
| 3,567,176 | 3/1971 | Johnson | 251/174 |
| 3,630,483 | 12/1971 | Canalizo | 251/174 |
| 3,842,861 | 10/1974 | Jandrasi | 251/172 X |
| 4,013,423 | 3/1977 | Evens | 251/214 X |
| 4,020,864 | 5/1977 | Church | 251/174 X |

Primary Examiner—Harold W. Weakley
Attorney, Agent, or Firm—Cushman, Darby & Cushman

[57] ABSTRACT

A ball valve assembly in which the ball and valve seats are readily removable from the valve housing, the valve being designed for a high temperature environment. The valve seats cooperate with seat supports and the ball, each of two valve seats comprising a single integral annular fluid-tight metallic spring member disposed between each seat support and the ball. Each metallic spring member comprises a cylindrical bellows length of one or more convolutions, with special ends that are finished in the shape of an internal spherical surface, the same as that of the ball and also that of the inner ends of the seat supports. Ready removal of the ball and valve seats is provided through an opening concentric with the axis of rotation of the ball stem. A flange is disposed in the opening and an annular portion thereof is held in abutting engagement with an annular portion of the valve body.

10 Claims, 4 Drawing Figures

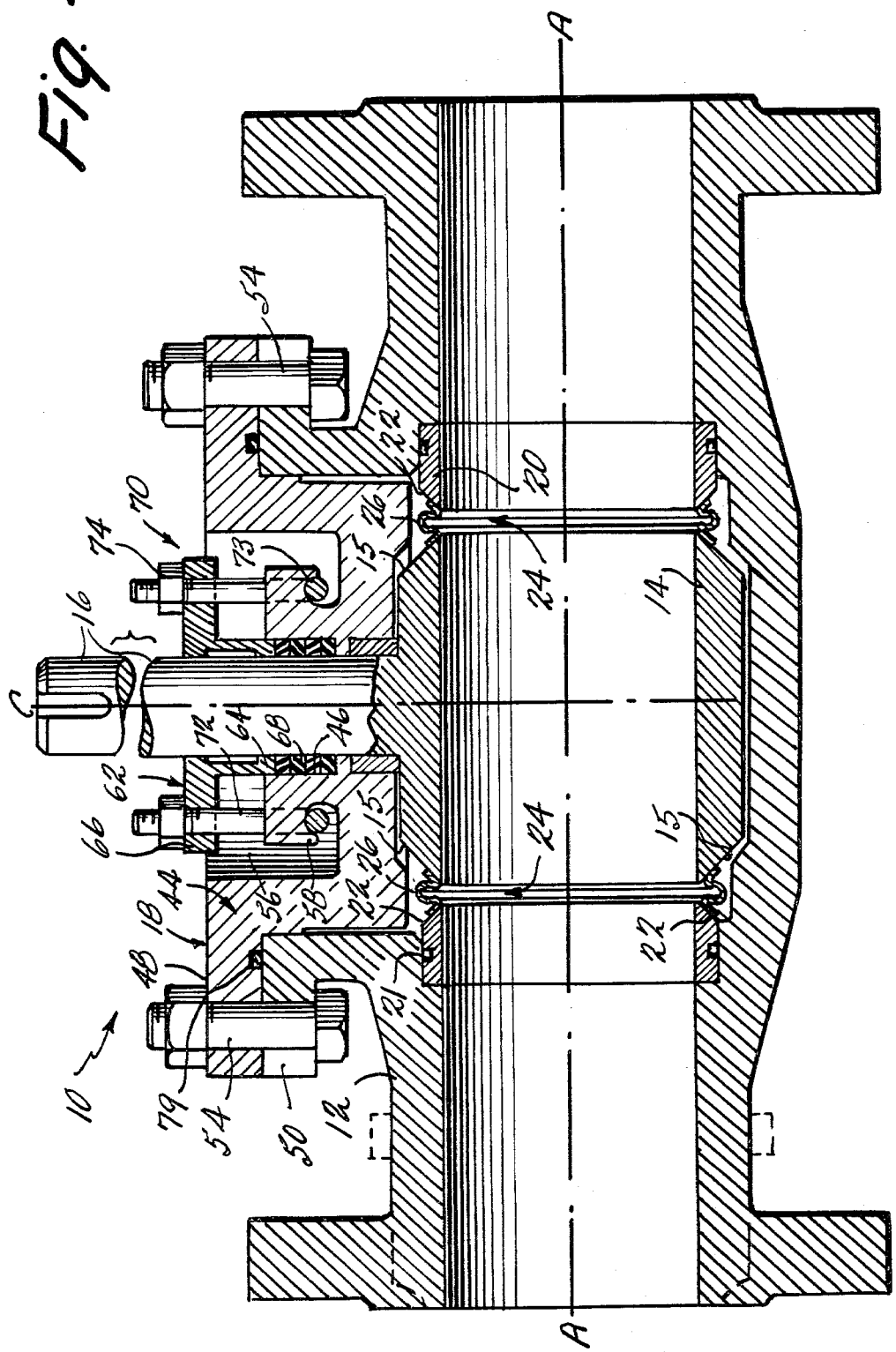

BALL VALVE WITH READILY REMOVABLE BALL AND SEATS FOR HIGH TEMPERATURE ENVIRONMENT

BACKGROUND AND SUMMARY OF THE INVENTION

The invention relates to a ball valve assembly for use particularly in high temperature environments, and one that can be serviced even with rusted body bolts. The ball valve assembly is generally of the same type as that shown in U.S. Pat. No. 3,445,087, having a ball element rotatable by a stem extending perpendicular to the fluid conducting bore through a valve body, structure for allowing removal of the ball and seals through an opening concentric with the stem, and seat supports having spherically machined annular end portions. The ball valve as shown in U.S. Pat. No. 3,445,087 is generally suitable for valving fluids, however, the valve seats thereof are formed of polymeric materials. Polymeric materials are not generally suitable for use in high temperature environments as is contemplated according to the present invention. According to the present invention, a ball valve assembly is provided that is suitable for use in high temperature environments, yet has the excellent sealing between the ball and valve body. Additionally, according to the present invention it is desirable to be able to avoid all body drilling and tapping, since such tapped holes tend to rust in high temperature valves. Rusted and unloosenable threaded members cannot be unthreaded to allow servicing. Additionally, high temperature valves are often required with welded connections on the body, and for such valves serviceability while the body remains welded in the pipeline is necessary. Therefore, this invention includes provision for servicing while the body remains welded in place.

According to the present invention, a single annular metallic spring bellows is disposed between each seat support portion and the ball of a ball valve, each bellows having concave spherical ends, to provide a reasonably fluid-tight metal-to-metal seal with the seat support portion and the ball. The metals of the valve, ball, and bellows springs are chosen to suit the conditions. Higher temperature operation may thus be provided. Additionally, according to the present invention, ready removal of the ball and sealing means from the valve housing is provided by the provision of a circular bore in the valve housing concentric with the valve stem of the ball valve, and a flange member disposed in that circular bore and having bearing and valve stem receiving bores formed therein, the flange member having an annular portion in laterally supportive engagement with an annular portion of the valve housing. A simple metallic seal or sheet gasket provides the seal between the abutting annular portions, and readily releasable means—such as a plurality of nuts and through-bolts—hold the annular portions in abutting engagement. Alternatively, a disc and lock ring can substitute for the flange, and cap screws can be provided.

It is the primary object of the present invention to provide a ball valve assembly that is eminently suited for use in high temperature environments and is readily serviceable in-line even when the connecting bolts, etc., have rusted or otherwise become immovable. These and other objects of the invention will become clear from an inspection of the detailed description of the invention, and from the appended claims.

BRIEF DESCRIPTION OF THE DRAWINGS

FIG. 4 is a side view, partly in cross-section and partly in elevation, of a modification of the ball-valve of FIG. 1.

DETAILED DESCRIPTION OF THE INVENTION

Figure 1:
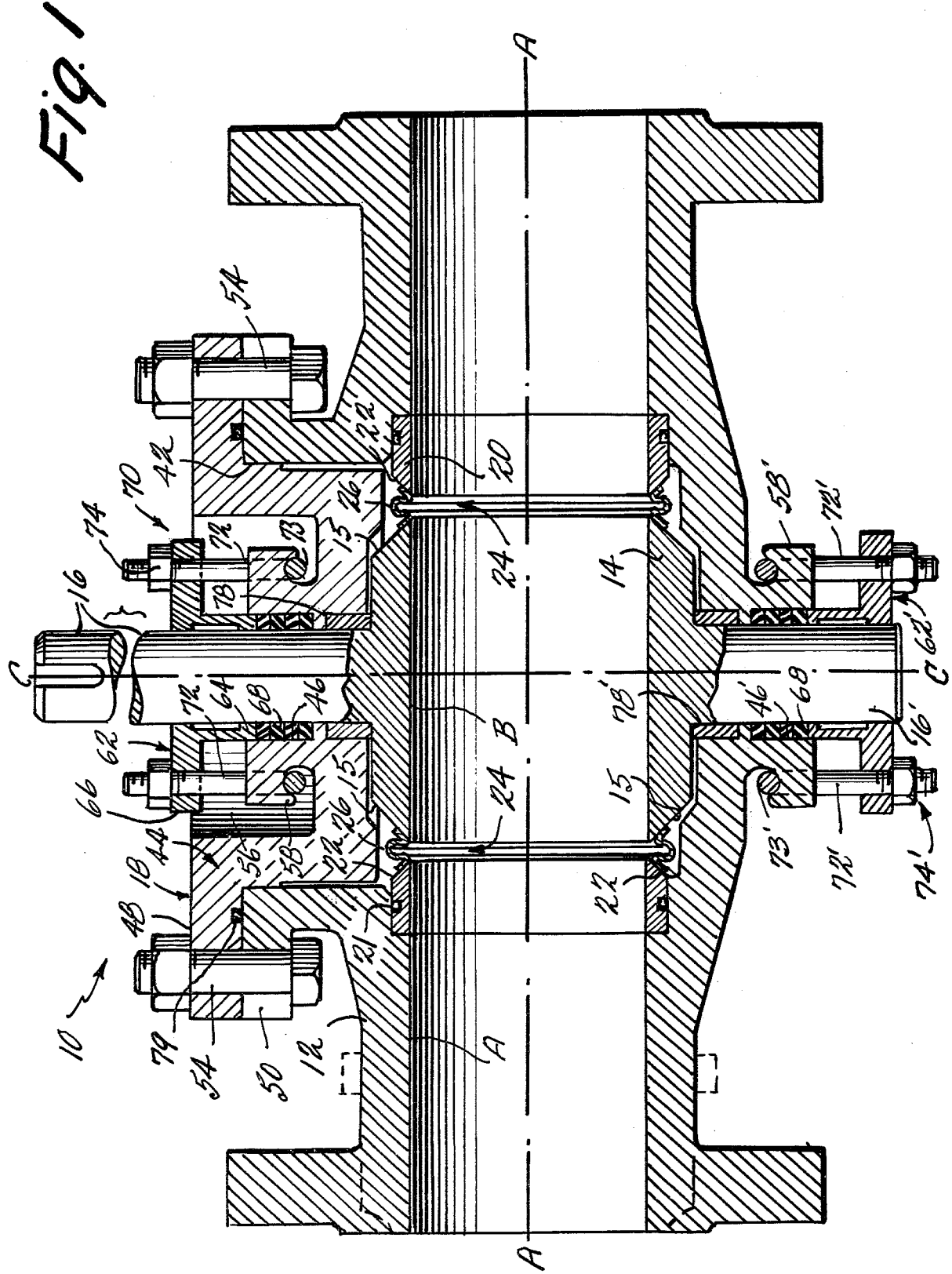
FIG. 1 is a side view, partly in cross-section and partly in elevation, of an exemplary ball valve assembly according to the present invention.

A ball valve assembly according to the present invention is shown in exemplary form generally at 10 in FIGS. 1 and 4. The ball valve assembly—as is conventional in the art—may include a valve body 12 having a fluid conducting bore A extending therethrough along an axis A—A, a metallic ball 14 having spherically curved portions 15 thereof disposed within the valve body 12, and having a bore B therethrough adapted to cooperate with the valve body bore, a valve stem 16 (either integral or separable) attached to the ball 14 and extending perpendicularly—along axis C—C—to the axis A—A, means 18 defining an opening in the valve body surrounding the valve stem 16 so that the valve stem 16 and ball 14 may be removed through the opening defined by the means 18. A pair of annular metallic valve seat support portions 20 are disposed in fluid-tight engagement by seals 21 with the valve body bore A and concentric therewith (or the portions 20 may be integral with body 12), each seat support 20 having a spherically curved annular end portion 22 thereof facing the ball 14, and cylindrical sealing means 24 are disposed between the ball 14 and each spherically curved annular end portion 22 of the seat supports 20, for allowing relative rotation between the ball 14 and the supports 20, but for preventing the passage of fluid flowing through the valve body bore A between the seat supports 20 and the ball 14. The construction of the sealing means 24, according to the present invention, is not conventional, however, nor is the construction of the means 18 defining the opening in the valve body 12; according to the present invention the sealing means 24 and the means 18 are constructed to provide high temperature service while still effecting proper sealing engagement between the seat supports 20 and the ball 14, and allow for in-line servicing of the valve even if the connectors are rusted.

The sealing means 24, according to the present invention, comprises a spring metallic cylindrical bellows member 26 with one or more convolutions 28, disposed between each seat support 20 and the ball 14, and concentric with the seat support 20. Each said bellows 26 has a concave spherical end 30 in engagement with a corresponding spherical surface 22 of support 20. This spherical engagement is under pressure of some pre-compression of bellows 26, forcing surfaces 22 and 30 (and 15 and 30′) together with that spring force, providing nearly fluid-tight metal-to-metal sealing engagement therewith.

Figure 2:
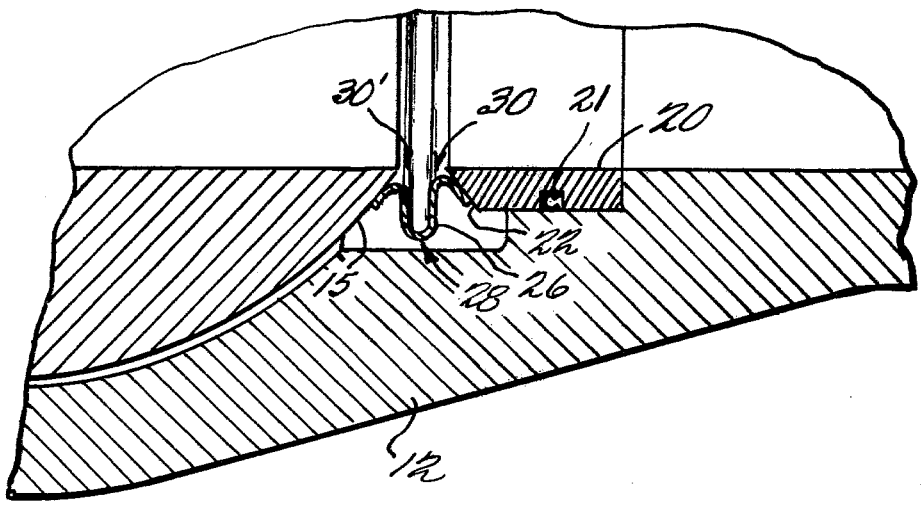
FIG. 2 is a detailed sectional view of the relationship between the sealing means, seat support, and ball of the assembly of FIG. 1.
Figure 3:
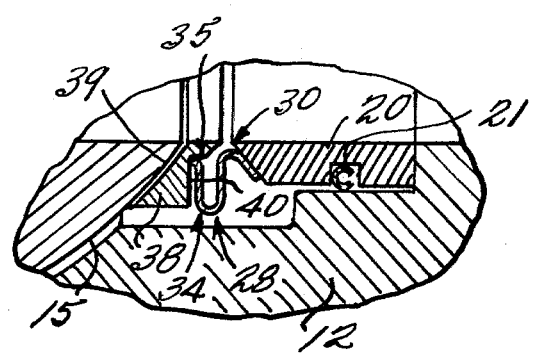
FIG. 3 is a detailed view similar to FIG. 2 showing a modified form of sealing means according to the present invention.

Alternative end forms may be provided for the second end 30′ of the bellows 26, which forms are illustrated in FIGS. 2 and 3. In the FIG. 2 embodiment, the second end 30′ also is formed as a concave spherical end corresponding to the spherical curvature of the surface 15 of ball 14, and providing nearly fluid-tight metal-to-metal sealing engagement therewith.

In the embodiment illustrated in FIG. 3, the bellows 26 is in fluid-tight operative engagement with an annular rigid metallic member 38 at the second end 30' thereto, which member 38 is concentric with the seat support 20. Each rigid metallic annular member 38 comprises a convex spherically curved annular end surface 39, corresponding in curvature to the spherical curvature 15 of the ball 14, and in metallic nearly fluid-tight engagement therewith. The member 38 can be fitted to the ball-end of bellows 26 by welding, shrink fitting, pressing, or a variety of similar mechanical means. For instance, an annular edge portion 40 of the member 38 may be in pressing engagement with a hooked tip portion 35 of bellows 26 having an annular edge as the axial termination thereof. The FIG. 3 embodiment will have a somewhat longer life under some circumstances than the FIG. 2 embodiment since the seal provided between the sealing means 24 and the ball 14 is provided by a more substantial member 38 than in the FIG. 2 embodiment. In both embodiments, a nearly fluid-tight seal is maintained over a long period of time, even in high temperature service, by suitable choice of wear-resistant, non-corroding metals, of which there is a great variety. The lengths of the seat supports 20, ball 14, and each bellows 26 along the axis A—A are designed so that the spring metallic bellows 26 each are under a slight compression when the ball 14 is in its proper position. This slight compression—which is provided for by the spring nature of the bellows 26 themselves without need of accessory biasing means—insures proper sealing engagement between the various components. However, it does not interfere with removal of the ball 14 from the valve body 12. As the ball 14 is raised to withdraw from the body 12, each bellows 26 expands while sliding over the spherical surfaces 15 and 22, and both the ball 14 and the bellows 26 can readily be removed from the body 12.

Seats supports 20 perform a useful function in this high temperature valve, by eliminating a problem usual in high temperature valves. Any valve that permits removal of the internal parts out a body opening must of necessity be non-symmetical about the longitudinal axis. This results in thermal expansion of regions of the valve in an unsymmetrical manner, and body shape change. The purpose of the seat supports is to provide a symmetrical member for the seat seal 26 to contact, so thermal expansion will not distort it and prevent good metal-to-metal sealing. The metallic seal 21 is sufficiently flexible that it provides fluid-tight engagement of seat support 20 with the valve body bore, even though the valve body may be distorted somewhat by virtue of non-symmetrical thermal expansion.

According to the present invention, the means 18 defining the opening in the valve body 12 is constructed in two alternative ways. FIGS. 1 and 4 show a flange (cover) 44 with through-bolts 54. (The term "through-bolt", as used in the specification and claims is intended to encompass studs, bolts, and other types of connectors that are not in threaded engagement with members fastened together thereby, but only with external fasteners, such as nuts.) When corrosion of the bolts 54 occurs, so that forcing the nuts off could cause bolts 54 to break, a new bolt is easily inserted. If instead of through-bolts 54, studs tapped into the body were used, forcing could break the stud. Recommissioning the valve would then require removal of the broken stud, a difficult task (especially for servicing in-line) in some valve locations. Therefore, the flanged construction of FIGS. 1 and 4 is specially arranged to allow use of all through-bolts 54 therethrough.

The second alternative way to arrange closure of opening 18 may be by provision of a simple plug disc and lock ring. The disc includes a packing box, and packing rings. This method of closure is not as preferred as the preceding method (employing through-bolts 54) in those applications where rusting and seizing of closure parts is a risk, but is well known and useful in clean and simple applications for the valve.

Flange 44 fits slidingly into bore 42, along axis C—C perpendicular to the axis of the fluid conducting bore A in the valve body (and thus colinear with the axis about which the valve stem 16 rotates), the bore 42 having a diameter slightly greater than the diameter of the ball 14. Flange 44 has a circular bore 46 therein for receipt of the ball stem 16, and packing rings 68 and 68', and an annular portion 48—extending radially of the axis C—C—that is in abutting engagement with an annular portion 50 of the body 12, extending radially of axis C—C. A simple metallic seal or sheet gasket sealing means 79 provides a fluid-tight seal between element 50 and the flange 44 annular portion 48. A plurality of through-nuts and bolts 54 are provided for holding the annular portions 48 and 50 in abutting engagement. It is a simple matter to effect removal of the ball 14 from the bore A, merely by removing the bolts 54, flange 44, and lifting the entire ball 14 out opening 18.

The valve of FIG. 4 differs from that of FIG. 1 only in the elimination of a second stem 16' of the FIG. 1 embodiment. Since the bellows 26 normally hold the ball 14 in place for rotation, it is—in the case of relatively low pressure valves—usually necessary only to provide a single stem 16 to provide a means for turning the ball 14 from the exterior of the housing 12. When two stems 16, 16' are provided, however, it is usually desirable to provide sealing means 68 and 68' and bearing means 78 and 78' for the stems 16, 16' when they are provided. According to the present invention, it is also desirable that—like the flange 50 assembly—readily releasable means are provided for the seals and bearings to allow servicing of the valve 10, even in-line.

Readily serviceable gland means according to the present invention may comprise a depression 56 formed in the flange (cover) 44, the depression 56 having two or more stout hooked-shaped portions 58 thereof extending radially outwards, then toward the valve, from the flange 44 and body 12. A sliding gland 62 having an axially (along axis C—C) extending portion 64, is also provided, the portion 64 extending into the circular bore 46 of the member 44. The gland 62 also has an annular portion 66 surrounding the axially extending portion 64 and concentric with the axis C—C. Sealing means 68 are disposed between the portions 46, 64, and 16, and the sealing means 68 are retained in position—and under compression when desirable—by readily releasable retaining means 70. The retaining means 70 preferably comprise at least a pair of T-shaped gland studs 72, each stud 72 having the T-portion 73 thereof engaging one or more portions 58, and a leg thereof received by the gland 62 annular portion 66. (The term "T-shaped" as used in the present specification and claims is intended to encompass hooked-end, actual T-shaped, or similar enlarged-head studs, bolts, or the like.) The ends of the studs 72 may be threaded and nuts 74 disposed thereon, for providing necessary tightening to positively hold and/or compress the sealing means 68. If one of the studs 72 is broken due to twisting of the nut 74, or rusting, etc., replacement is simple and easy compared to the situation wherein threaded studs are tapped into the flange 44.

According to the FIG. 1 embodiment, the extension 16' of the ball stem 16 is provided on the opposite side of the ball 14, so that the two stems 16 and 16' are used for balancing the axial (along axis C—C) pressure forces, without the need for thrust bearings and therefore allowing a higher pressure rating. A bore 46' formed in the valve housing 12 receives the stem portion 16', and the seals 68' are positively retained and compressed by a collar 62' attached by T-shaped rods 72'—which T-shaped rods 72' engage hook-portions 58'—and retaining means 74'.

INSTALLATION AND OPERATION

The installation and operation of the valve assembly to the present invention is simple, yet is conducive to high temperature service. When installing the ball 14 in bore A, the sealing means 24 are disposed within the bore, and the ball 14 is lowered into the bore A, the sealing members 26 being slightly compressed between the ball 14 and the seat supports 20, and providing sealing engagement between portions 22 and 15 of the seat supports and ball respectively. In the FIG. 1 embodiment, the stem 16' which passes through the bore 46', is retained in place by bearing 78', and the nuts 74 for compressing the sealing means 68' are tightened. Then the male flange member 44 is disposed so that the stem 16 is received by the bore 46, and the gland 62 is put in place and tightened down to positively compress the sealing means 68. Balanced support is provided for the stem 16 without the necessity of thrust bearings, and the ball 14 may be rotated to dispose the bore B in either communicating or non-communicating relationship with the bore A by simple turning of the stem 16.

The male flange member 44 is held in place positively by the nuts and through-bolts 54, the nuts and bolts 54 holding the annular portions 48, 50 in abutting engagement and compressing an annular metal seal or sheet gasket to provide fluid-tight engagement. Ready removal of the ball 14 and sealing means 24 from the bore A may be effected by reversing the above procedures, and when the bolts 54, 72, 72' are rusted fast, etc., they may simply be cut or chiseled off and new bolts put in place, making in-line servicing in a wide variety of environments possible.

It will thus be seen that according to the present invention a ball valve assembly has been provided that provides proper service even in high temperature environments, and is readily serviceable, even in-line. While the invention has been shown and described as what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A ball valve assembly including a valve body having a fluid-conducting bore extending therethrough along an axis, a metallic ball having spherically curved portions and disposed within said valve body and having a bore therethrough adapted to cooperate with said valve body bore, a valve stem attached to said ball and extending generally perpendicularly to the axis of the fluid-conducting bore through said valve body, a pair of annular metallic valve seat supports of said valve body, each seat support having a sperically curved annular end portion thereof facing said ball, and sealing means disposed between said ball and each sperically curved annular portion of said seat supports:

said sealing means comprising a spring metallic, all metal, bellows disposed between each seat support and said ball and concentric with each said seat support; each said bellows consisting of a concave spherical first end portion extending toward each said seat support, corresponding to the spherical curvature of said support portion annular end portion and in non-affixed abutting engagement with said seat support annular end portion to provide a fluid-tight metal-to-metal seal with said seal support; a second end portion, a line parallel to said valve body bore passing through said bellows end portions; and at least one convolution disposed between and radially outward of said end portions; and wherein said bellows second end portion is operatively associated with a rigid metallic annular member concentric with said seat support and disposed between each bellows and said ball, each said rigid metallic annular member comprising a first, spherically curved annular surface corresponding in curvature to the spherical curvature of said ball and in metallic fluid-tight engagement therewith, and a second annular surface in operative association with said bellows second end.

2. An assembly as recited in claim 1 wherein said seat supports are separable inserts disposed in said valve body bore and concentric therewith.

3. An assembly as recited in claim 1 wherein said ball and said stem are one-piece.

4. An assembly as recited in claim 3 further comprising a second stem, extending from said ball, and integral therewith, opposite said stem, said second stem passing through said valve body.

5. An assembly as recited in claim 4 further comprising bearing means associated with said valve body for supporting and guiding rotation of said stems.

6. An assembly as recited in claim 1 further comprising means defining an opening in said valve body surrounding said valve stem so that said valve stem and ball may be removed through said opening, a cover covering said opening, and through-bolts accessible at both ends for holding said cover to said valve body.

7. An assembly as recited in claim 6 further comprising gland means surrounding said stem and T-head through-extending gland studs operatively connected to said gland means and said valve body for holding said gland means in operative association with said valve body.

8. An assembly as recited in claim 1 further comprising means defining said opening in said valve body surrounding said valve stem comprising a circular bore formed in said valve body having an axis perpendicular to the axis of said fluid-conducting bore therein, and with a diameter greater than the diameter of said ball;

a male flange member having a circular bore therein for receipt of said valve stem and concentric with said circular bore in said valve body, and having an annular portion in abutting engagement with an annular portion of said valve body surrounding said valve body circular bore;

means for providing a seal between said valve body and male flange annular portions; and through-bolts holding said male flange and valve body annular portions in abutting engagement with each other.

9. An assembly as recited in claim 8 further comprising a depression formed in said male flange member surrounding said circular bore therein, said depression having a hooked-shaped portion defining a concave depression;

a collar having an axially extending portion extending into said circular bore of said male flange member and having an annular portion surrounding said axially extending portion;

bearing means disposed between said axially extending portion of said collar, said male flange member circular bore, and said valve stem; and releasable means for retaining said bearing means in position disposed between said collar, flange member, and valve stem, said releasable means comprising at least a pair of T-head rods having the T portion thereof engaging said hook-shaped portion concave depression, and having a leg thereof received by said collar annular portion.

10. An assembly as recited in claim 1 wherein said bellows second end comprises a hooked tip edge portion.

* * * * *